R. S. DARLING.
STRAINING DEVICE.
APPLICATION FILED JULY 15, 1915.
1,153,768. Patented Sept. 14, 1915.
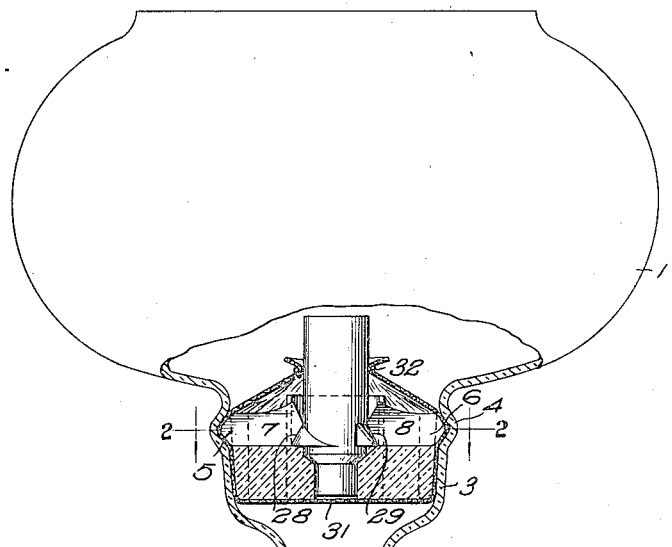
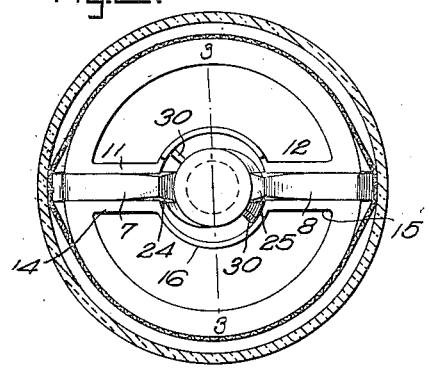
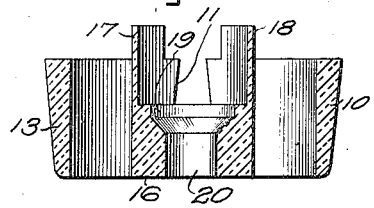
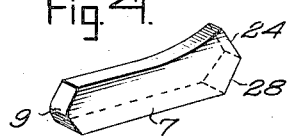
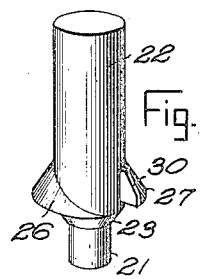
WITNESSES
C. H. Reichenbach.
A. L. Kitchin
INVENTOR
Richard S. Darling
BY Munn & Co
ATTORNEYS

UNITED STATES PATENT OFFICE.

RICHARD S. DARLING, OF NEW YORK, N. Y., ASSIGNOR TO PARAMOUNT GLASS PERCOLATOR MFG. CO., OF NEW YORK, N. Y., A CORPORATION OF DELAWARE.

STRAINING DEVICE.

1,153,768. Specification of Letters Patent. Patented Sept. 14, 1915.

Application filed July 15, 1915. Serial No. 40,138.

*To all whom it may concern:*

Be it known that I, RICHARD S. DARLING, a citizen of the United States, and a resident of the city of New York, borough of Manhattan, in the county and State of New York, have invented a new and Improved Straining Device, of which the following is a full, clear, and exact description.

This invention relates to straining devices for percolators and has for an object the provision of an improved arrangement whereby all metallic parts are eliminated.

Another object in view is to provide a straining device for coffee percolators wherein the coffee receiving globe is formed with a groove for receiving a locking member, the same being associated with a straining device.

A still further object in view is to provide a straining device formed with a plurality of removable porcelain members and a straining medium surrounding the same.

In the accompanying drawings: Figure 1 is a side view of the upper bowl of a coffee percolator, part of the same being broken away for better illustrating the strainer arranged therein and the parts for holding the strainer in position; Fig. 2 is a section through Fig. 1 on line 2—2, the same being on an enlarged scale; Fig. 3 is a sectional view through the strainer block, the same being taken approximately on line 3—3 of Fig. 2; Fig. 4 is a detail perspective view of one of the locking bars; Fig. 5 is a detail perspective view of the locking screw forming part of the straining device.

Referring to the accompanying drawings by numerals, 1 indicates the upper bowl of a percolator and 2 a stem connected with the bowl through an enlargement 3 which is adapted to receive a straining device. The enlargement 3 is provided with an annular groove 4 into which the ends 5 and 6 of bars 7 and 8 are forced when it is desired to lock the straining device in position. The outer ends of bars 7 and 8 are provided with a rounded or converging face 9 which is adapted to engage the upper part of the wall of groove 4 when the same is applied and crowd the bars 7 and 8 downwardly to the position shown in Fig. 1 and also crowd the straining block 10 to the position shown in Fig. 1.

The locking bars 7 and 8 are arranged in grooves 11 and 12 in the straining block 10, which straining block is made from porcelain or other similar material and provided with an annular portion 13 adapted to substantially fit the connecting portion 3 of bowl 1. A pair of connecting webs 14 and 15 extend across the strainer block 10, as shown in Fig. 2, into which the grooves 11 and 12 are arranged. A central enlargement 16 connects the webs 14 and 15, said central enlargement being provided with upstanding walls 17 and 18 whereby the device may be readily grasped by the hand. Within the enlargement 16 is arranged the beveled seat 19 and an aperture 20. The aperture 20 is adapted to receive the lower part 21 of the locking plug 22, which locking plug is provided with a beveled portion 23 arranged to engage the beveled faces 24 and 25 of the bars 7 and 8 for forcing the bars outwardly. After the bars have been forced outwardly by the beveled portion 23 the locking plug 22 is turned, as shown in Fig. 1, so that the tapered inclined lugs 26 and 27 will engage the under beveled faces 28 and 29. It will be observed that by reason of the taper of these lugs the ends of the locking bars 7 and 8 are held tightly in the groove 4. If for any reason the bars 7 and 8 should be comparatively short and consequently not tightly held in place, the plug 22 is prevented from turning beyond the large end of the lugs 26 and 27 by stops 30 arranged on the large end of each of the lugs 26 and 27, as clearly shown in Fig. 5.

When placing the straining device in position the bars 7 and 8 are placed in the grooves 11 and 12 and then a straining cloth or member 31 of any suitable kind is placed over the straining block 10 and bars 7 and 8. These parts are then placed in substantially the position shown in Fig. 1 and plug 22 forced downwardly until the beveled portion 23 of plug 22 strikes against the seat 19. The plug is then turned as far as possible or until the stops 30 have engaged their respective blocks. By this construction and arrangement the locking bars 7 and 8 will be locked in their outer position and the straining cloth 31 will be firmly held against movement. If desired, a suitable tie string or draw string 32 may be used for drawing the upper part of the cloth 31 against the plug 22. After the strainer has been arranged in position in this manner the coffee may then be put in bowl 1 and the percolator used in the usual manner. In this form of percolator the hot water is first forced upwardly through stem 2 from a suitable receptacle and consequently mixed with the coffee in bowl 1, after which the water is allowed to pass downwardly through the straining device arranged in the enlargement 3 and be discharged out of the extension 2. Of course, the water being hot and having mixed with the coffee will absorb or extract all of the flavor therefrom so that a proper beverage will be produced without any of the coffee grounds or sediment being discharged. It will be noticed that the locking bars 7 and 8, plug 22 and the straining block 10 are all made from porcelain or other similar material, thus dispensing with the use of any form of metal or other objectionable matter.

What I claim is:

1. In a straining device of the character described, a straining block having openings therethrough, a straining member surrounding said block, and a plurality of locking members arranged in said block for holding the same in position, all of said members being non-metallic.

2. In a device of the character described, the combination with a bowl having a groove, of a strainer block arranged in said bowl adjacent said groove, a straining member surrounding said block, a locking membe, arranged in said block and adapted to be forced into said groove, said locking member pinching said straining medium in said groove, all of said members being non-metallic.

3. In a device of the character described, the combination with a glass bowl having an annular groove, of a porcelain strainer block arranged in said bowl adjacent said groove, a pair of porcelain locking bars slidingly fitted into said block and adapted to be projected so that one end of each block will fit in said groove, means for holding said locking bars in their locked position, and a straining medium for straining the matter passing through said straining block.

4. In a device of the character described, the combination with a bowl having a discharge stem and an enlargement or chamber between the discharge stem and the bowl, said enlargement being provided with an annular groove interiorly, a straining block arranged in said enlargement, said straining block having passageways therethrough and laterally extending grooves, a locking bar arranged in each of said grooves and adapted to be moved so that one end will fit into the groove of said enlargement, a straining member for straining the matter passing through said straining block, and means for holding said locking blocks so that their ends will remain in said groove.

In testimony whereof I have signed my name to this specification in the presence of two subscribing witnesses.

RICHARD S. DARLING.

Witnesses:
A. L. KITCHIN,
PHILIP D. ROLLHAUS.